No. 618,331. Patented Jan. 24, 1899.
J. R. CARTER.
WASHING MACHINE.
(Application filed Mar. 8, 1898.)
(No Model.) 2 Sheets—Sheet 2.
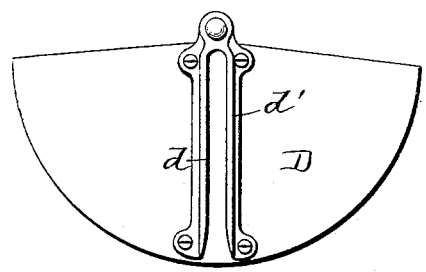
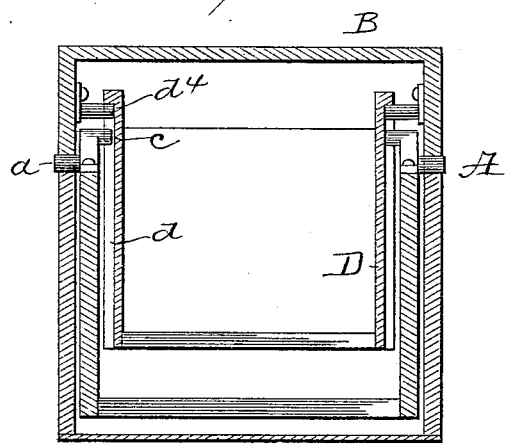
WITNESSES
E. J. Nottingham
G. F. Downing
INVENTOR
J. R. Carter
By H. J. Seymour
Attorney
THE NORRIS PETERS CO., PHOTO-LITHO., WASHINGTON, D. C.

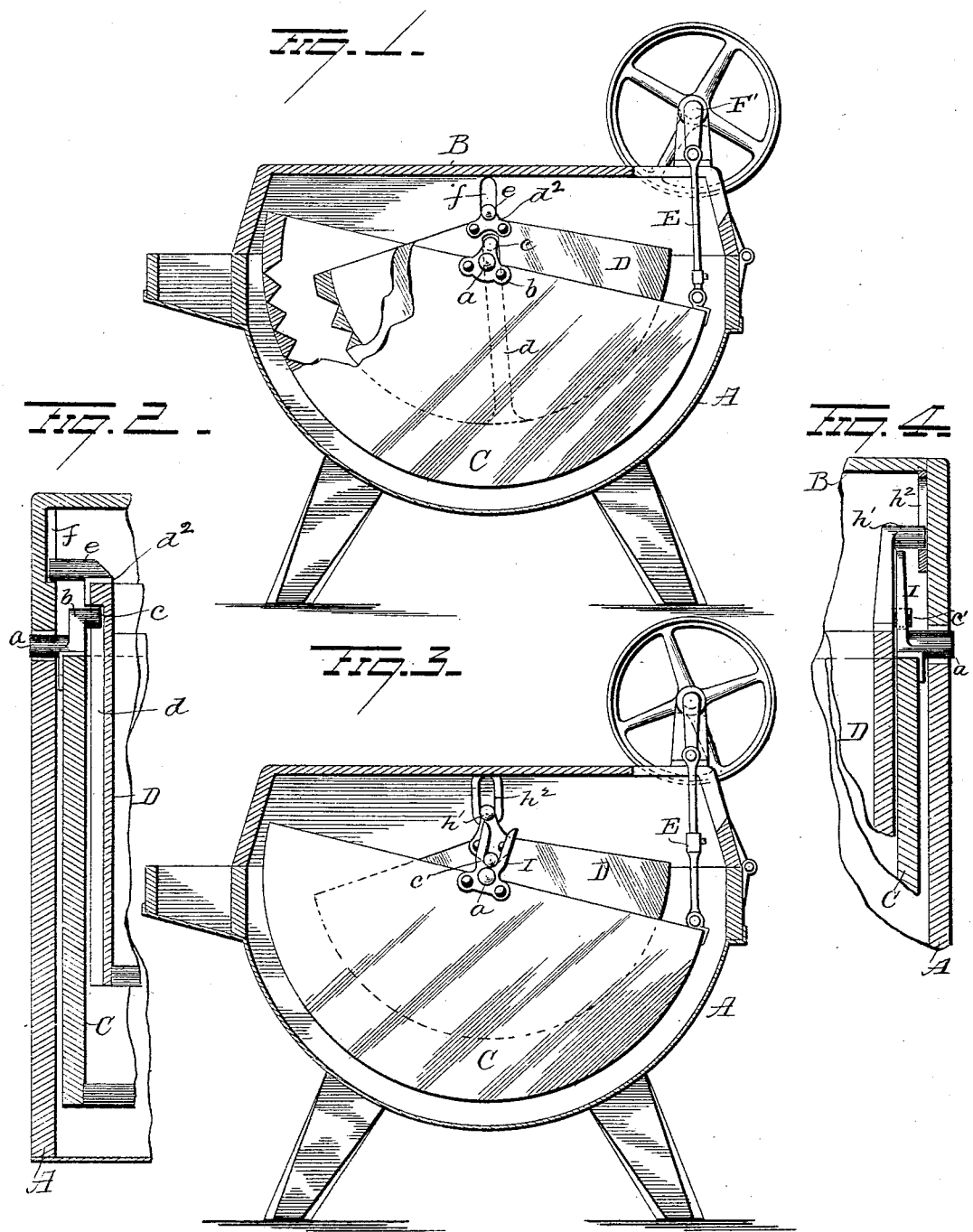

UNITED STATES PATENT OFFICE.

JOHN R. CARTER, OF CINCINNATI, OHIO.

WASHING-MACHINE.

SPECIFICATION forming part of Letters Patent No. 618,331, dated January 24, 1899.

Application filed March 8, 1898. Serial No. 673,095. (No model.)

*To all whom it may concern:*

Be it known that I, JOHN R. CARTER, of Cincinnati, in the county of Hamilton and State of Ohio, have invented certain new and useful Improvements in Washing-Machines; and I do hereby declare the following to be a full, clear, and exact description of the invention, such as will enable others skilled in the art to which it appertains to make and use the same.

My invention relates to an improvement in washing-machines, and more particularly to that class of machines wherein two rubbers oscillate in opposite directions.

The object of my invention is to provide improved means for oscillating the upper rubber; and my invention consists in the parts and combinations of parts, as will be more fully described, and pointed out in the claims.

In the accompanying drawings, Figure 1 is a view in longitudinal section of my improved machine. Fig. 2 is a view in transverse vertical section, and Figs. 3, 4, 5, and 6 are views of a modified form.

A represents a tub, preferably semicylindrical in form and mounted on legs, and B is a cover hinged at one end of the tub and adapted to be swung back so as to disclose the rubbers.

The lower rubber C is ribbed on its inner curved face and is provided centrally at its sides with trunnions $a$, which latter rest in bearings secured to the body of the tub.

The rubber C is provided centrally at both sides with the brackets $b$, each of which is provided with an inwardly-projecting pin or lug $c$, the latter being preferably in a plane above the tops of the sides of the lower rubber C and adapted to project or rest within the elongated vertical grooves $d$ formed centrally in the sides of the upper rubber. These grooves are closed at the top and open at the bottom, the bottoms of the grooves being flaring for the ready introduction of the pintles or lugs $c$.

While I have described the grooves as being in the sides of the upper rubber, it is evident that these grooves could be formed in plates $d'$, secured to said sides, as shown in Fig. 5.

The upper rubber D is provided at its sides with brackets or plates $d^3$, carrying pintles $e$, which latter rest in elongated slots $f$ in the inner faces of the sides of the cover or in slots in plates secured to said faces in a manner similar to that shown at $h'$ $h^2$, Fig. 4. If desired, however, the slots can be formed in the sides of the upper rubber and receive pintles carried by the cover, as shown at $d^4$ in Fig. 6. In either event it will be seen that the upper rubber D is supported or carried by the pintles $e$, resting in the slots in the cover, and is free to move up or down within the limits of the slots, and that the upper rubber is engaged by the lugs $c$ of the lower rubber at points below the supporting-pintles $e$. Hence it follows that if the lower rubber C be oscillated the upper rubber D will be oscillated in an opposite direction, the upper rubber being actuated by the lower rubber and so connected as to move in unison with the same.

The lower rubber is actuated by the pitman E, pivoted at one end to the lower rubber and attached at its other end to the crank-shaft F, mounted in bearings on the cover. This crank-shaft carries a fly-wheel and handle for actuating the same. With this construction it will be seen that by elevating the cover the upper rubber will be raised, thus permitting of the ready introduction of the clothes within the lower rubber or between the two rubbers, and when the cover with the upper rubber is lowered the latter comes in contact with the clothes and is supported thereon, the pintles and slots in the upper rubber and cover preventing lateral and longitudinal displacement of the upper rubber. By now rocking the lower rubber by means of the pitman E and crank-shaft F rocking motion in a direction opposite the motion of the lower rubber will be imparted to the upper rubber through the intervention of the pins or lugs $c$ on the lower rubber and the grooves $d$ on the upper rubber.

In the construction disclosed in Figs. 3 and 4 the upper rubber is provided at its sides with upwardly-projecting arm shaving outwardly-projecting pintles $h'$, which rest in elongated slots $h$ formed in plates on the inner faces of the sides of the cover, and is rocked by the yokes I, secured to the sides of the lower rubber C and engaging pintles $c'$ on the sides of the upper rubber below the pintles h'. The yokes I are open at the top and are made flaring, so as to readily receive the pintles c' as the cover is lowered.

It is evident that many slight changes might be resorted to in the relative arrangement of parts herein shown and described without departing from the spirit and scope of my invention. Hence I would have it understood that I do not wish to confine myself to the exact construction of parts herein shown and described; but, Having fully described my invention, what I claim as new, and desire to secure by Letters Patent, is—

1. In a washing-machine, the combination with a receptacle, a lower rubber mounted to oscillate therein, and driving means connected with said lower rubber, of an upper rubber, elongated bearings within the receptacle, pivots for the upper rubber disposed in said elongated bearings and driving means connecting the lower rubber directly with the upper rubber within said receptacle, whereby motion imparted to the lower rubber will cause the upper rubber to oscillate in a reverse direction.

2. In a washing-machine, the combination with a receptacle, a lower rubber pivotally mounted in said receptacle and driving means connected with said lower rubber, of a cover connected to the receptacle and having depending flanges, an upper rubber, elongated bearings within the depending flanges of the cover, pivots for the upper rubber disposed in said elongated bearings and driving means connecting the lower rubber with the upper rubber whereby motion imparted to the lower rubber from its driving means will cause the upper rubber to oscillate in a reverse direction.

3. In a washing-machine the combination with a receptacle, a rubber pivotally mounted in said receptacle, a cover hinged to the receptacle and an upper rubber pivotally connected to the inside of the cover by elongated bearings, and pintles, of a crank-shaft, a pitman connecting the crank-shaft and lower rubber, and a slidable connection between the lower and upper rubbers below the pivotal supports of the upper rubber whereby motion is transmitted from the lower rubber to the upper rubber.

4. In a washing-machine, the combination with a receptacle, a rubber pivotally mounted therein, a cover hinged to the receptacle, and an upper rubber pivotally connected to the inside of the cover by elongated bearings and pintles, of a crank-shaft, a pitman connecting the crank-shaft and lower rubber, and brackets secured to the lower rubber and having inwardly-projecting pintles resting in elongated slots in the sides of the upper rubber below the pivotal connection of the latter within the cover.

In testimony whereof I have signed this specification in the presence of two subscribing witnesses.

JOHN R. CARTER.

Witnesses:
S. W. FOSTER,
VERNON E. HODGES.